(12) United States Patent
Nahm et al.

(10) Patent No.: US 7,364,330 B2
(45) Date of Patent: Apr. 29, 2008

(54) SPOILER HAVING INTEGRAL STOP LAMP COVER

(75) Inventors: Alexander Hong Nahm, Gyeongsangbug-do (KR); O Yeol Kwon, Daegu-si (KR)

(73) Assignee: Moya International Co. Ltd., Gyeongsangbug-Do (KR)

( * ) Notice: Subject to any disclaimer, the term of this patent is extended or adjusted under 35 U.S.C. 154(b) by 176 days.

(21) Appl. No.: 11/375,916

(22) Filed: Mar. 15, 2006

(65) Prior Publication Data

US 2007/0076418 A1    Apr. 5, 2007

(30) Foreign Application Priority Data

Sep. 28, 2005   (KR) ................ 10-2005-0090340

(51) Int. Cl.
*B60Q 1/44* (2006.01)
(52) U.S. Cl. ............... 362/496; 362/541; 296/180.1
(58) Field of Classification Search ............... 362/496, 362/541, 540, 545, 546; 296/180.1, 68.3; 340/479
See application file for complete search history.

(56) References Cited

U.S. PATENT DOCUMENTS

| | | | | |
|---|---|---|---|---|
| 4,845,600 A | * | 7/1989 | Matsumura et al. | 362/547 |
| 5,709,453 A | * | 1/1998 | Krent et al. | 362/496 |
| 7,150,554 B2 | * | 12/2006 | Calderas | 362/545 |
| 7,175,321 B1 | * | 2/2007 | Lopez | 362/496 |
| 7,195,727 B2 | * | 3/2007 | Sienkiewicz et al. | 264/132 |
| 7,220,032 B2 | * | 5/2007 | Mori | 362/541 |

* cited by examiner

*Primary Examiner*—Stephen F Husar
*Assistant Examiner*—Peggy A. Neils
(74) *Attorney, Agent, or Firm*—Volpe and Loenig P.C.

(57) ABSTRACT

A spoiler for a vehicle has an integral stop lamp cover. The stop lamp cover comprises a cover body configured to be open at an upper end thereof, and having a stop lamp insertion opening, a stop lamp receiving space, and a flange part formed on an upper end of the cover body; and an upper plate coupled to the cover body, having a size capable of covering the stop lamp receiving space, and defining the stop lamp receiving space and a parison fusing section to which a parison for forming a spoiler body is fused. The stop lamp cover is inserted into a mold when implementing the blow molding process, the flange part is fused to the outer surface of the spoiler body to be integrated with the material of the spoiler without requiring the use of a separate coupling means, and the parison is fused to the parison fusing section.

7 Claims, 12 Drawing Sheets

SPOILER HAVING INTEGRAL STOP LAMP COVER

BACKGROUND OF THE INVENTION

1. Field of the Invention

The present invention relates, in general, to a spoiler installed on a vehicle, and more particularly to a spoiler which has an integral stop lamp cover to ensure easy mounting of an auxiliary stop lamp, that is, a center high-mount stop lamp (CHMSL), to a spoiler for a vehicle.

2. Description of the Prior Art

As is generally known in the art, various types of spoilers have been used depending upon the kind of vehicle. Such spoilers for vehicles are usually installed on the rear parts of the vehicles. The spoilers for vehicles function to prevent vehicle bodies from being lifted by air currents created when the vehicles travel at high speeds, thereby ensuring driving stability of the vehicles and reducing vibration and wind noise while the vehicles travel on roads.

In a vehicle, combination lamps are respectively installed on each side of the rear part of the vehicle to allow the driver of a following vehicle to discern the braking state of the preceding vehicle and thereby prevent a rear-end collision. However, it is difficult for the driver of the following vehicle to reliably discern the braking state of the preceding vehicle from stop lamps included in the combination lamps. Therefore, it is the norm that an auxiliary stop lamp, that is, a center high-mount stop lamp (CHMSL), is separately installed on the vehicle.

Such an auxiliary stop lamp is installed on the center portion of the rear part of a vehicle when the vehicle is finally assembled, or is coupled to a side of a spoiler when the spoiler is installed on the vehicle.

In a conventional method for installing the auxiliary stop lamp (hereinafter, simply referred to as "stop lamp") on a spoiler for a vehicle, as shown in FIG. 1, a stop lamp 20 is installed on a side of a spoiler body 11 by bolts 30.

In another method, as shown in FIG. 2, a stop lamp cover 50 having a predetermined size is coupled to a side of a spoiler 10a, and a stop lamp 20 comprising an LED or a bulb lamp is fitted into the stop lamp cover 50 to allow freedom in design of the spoiler 10a.

The stop lamp cover 50 is coupled to the side of the spoiler body 11a through bolts 30. The stop lamp 20 is fastened to the stop lamp cover 50 by coupling the back end of the stop lamp 20 to a projecting rib 51 formed on the inner surface of the stop lamp cover 50 by bolts 30a.

In the spoiler 10a on which the stop lamp 20 is installed using the stop lamp cover 50, it is possible to provide various spoiler designs when compared to the spoiler 10 on which the stop lamp 20 is directly installed. But, the strength of a coupling part between the spoiler 10a and the stop lamp cover 50 is likely to be degraded by vibration of the vehicle body which is generated while the vehicle travels on the road.

Further, since the conventional stop lamp cover 50 is manufactured separately from and then assembled to the spoiler 10a, the number of parts increases and the manufacturing cost increases.

SUMMARY OF THE INVENTION

Accordingly, the present invention has been made keeping in mind the above problems occurring in the prior art, and an object of the present invention is to provide a spoiler in which a stop lamp cover is integrally fused to a side of a spoiler body.

In order to achieve the above object, a spoiler having an integral stop lamp cover according to the present invention is constructed in a manner such that, when a spoiler to be installed on the rear part of a vehicle, such as on a trunk lid or a roof panel, is formed through blow molding, the stop lamp cover is inserted into a mold and is then integrally fused to a side of a spoiler body.

Through the blow molding process, the spoiler is formed to have a hollow sectional shape. The stop lamp cover has a size allowing a stop lamp comprising light emitting means such as an LED, a bulb or the like to be received therein. The stop lamp cover is largely comprised of a cover body and an upper plate coupled to the upper end of the cover body.

The cover body of the stop lamp cover is configured to be open at an upper end thereof. The cover body has a stop lamp insertion opening which is defined on a front wall of the cover body to allow a stop lamp to be inserted through it, a stop lamp receiving space in which the stop lamp, inserted through the stop lamp insertion opening, is received, and a flange part which is formed on an upper end of the cover body to extend outward.

The upper plate of the stop lamp cover is coupled to the upper part of the cover body and has a size capable of covering the stop lamp receiving space. Due to the presence of the upper plate, a parison fusing section is defined on the upper part of the cover body so that a parison for forming a spoiler body is fused to the parison fusing section in the blow molding process, and the stop lamp receiving space is defined on the lower part of the cover body so that the stop lamp is received in the stop lamp receiving space.

The stop lamp cover, constructed by combining the cover body and the upper plate, is inserted into a mold when conducting the blow molding process for forming the spoiler, the flange part is fused to the outer surface of the spoiler body to be integrated with the material of the spoiler without using separate coupling means, and the parison is fused to the parison fusing section, whereby the spoiler having the integral stop lamp cover is formed.

A plurality of support parts, each comprising a rib, are formed on the inner surface of the cover body to support the upper plate so that the upper plate is not moved downward by the weight of the parison fused to the parison fusing section, and a plurality of protruding parts are also formed on the inner surface of the cover body to maintain the stop lamp, inserted into the stop lamp receiving space through the stop lamp insertion opening, in a fixed state.

Depending upon a manufacturing procedure, the cover body and the upper plate of the stop lamp cover may be formed integrally with each other to constitute a single part.

The parison fusing section defined by the upper plate has a depth sufficient to prevent the stop lamp cover from becoming separated from the spoiler body even when shock is externally applied to the stop lamp cover.

Auxiliary adhesive means such as an adhesive tape or a plastic primer may be provided to the upper surface of the flange part to allow the flange part of the cover body to be easily fused to the melted parison constituting the spoiler body in the spoiler blow molding process.

Locking holes are defined through the rear wall of the stop lamp cover so that locking means such as bolts can pass through the locking holes to be locked with nuts, and the stop lamp is fastened to the stop lamp cover by the locking means passing through the locking holes. Further, separately from the locking means, the stop lamp may be fastened using an adhesive tape.

BRIEF DESCRIPTION OF THE DRAWINGS

The above and other objects, features and other advantages of the present invention will be more clearly understood from the following detailed description when taken in conjunction with the accompanying drawings, in which:

FIGS. 6a, 6b and 6c are enlarged cross-sectional views illustrating various flange parts of the stop lamp cover which are integrated with a spoiler body according to the present invention; and FIGS. 7a and 7b through 9 are schematic cross-sectional views illustrating a blow molding process for forming the spoiler having an integral stop lamp cover according to the present invention.

DETAILED DESCRIPTION OF THE INVENTION

Figure 1:
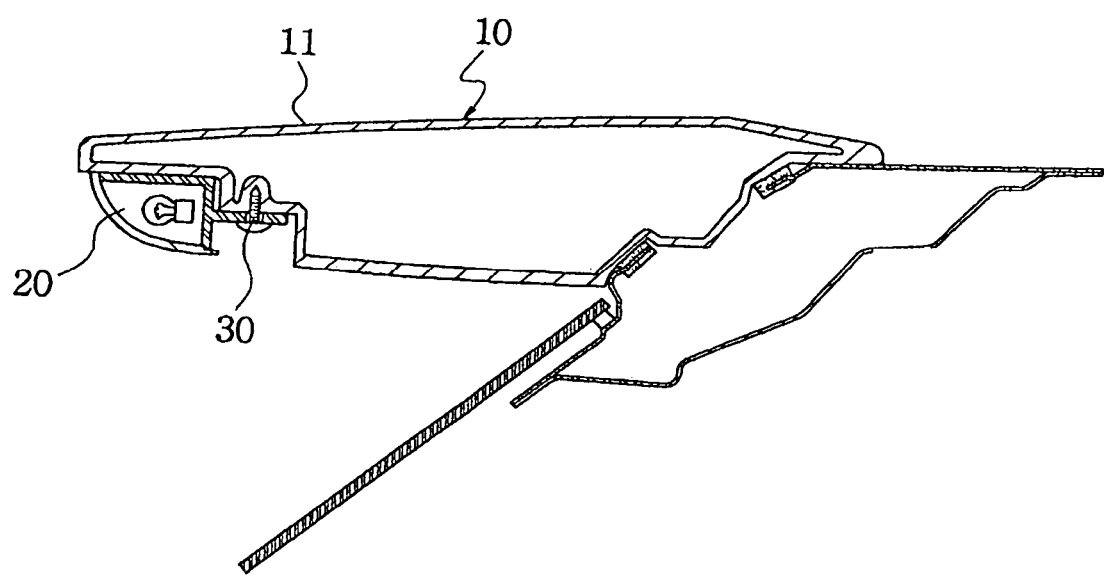
FIG. 1 is a cross-sectional view illustrating a conventional spoiler to which a stop lamp is directly coupled.
Figure 2:
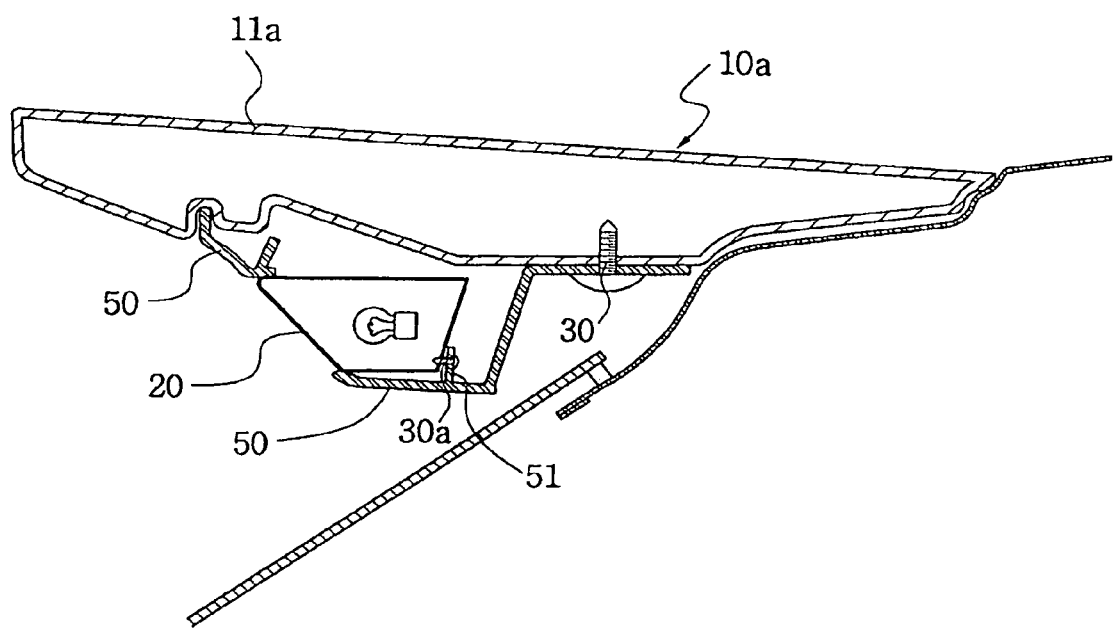
FIG. 2 is a cross-sectional view illustrating another conventional spoiler to which a stop lamp cover is coupled.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
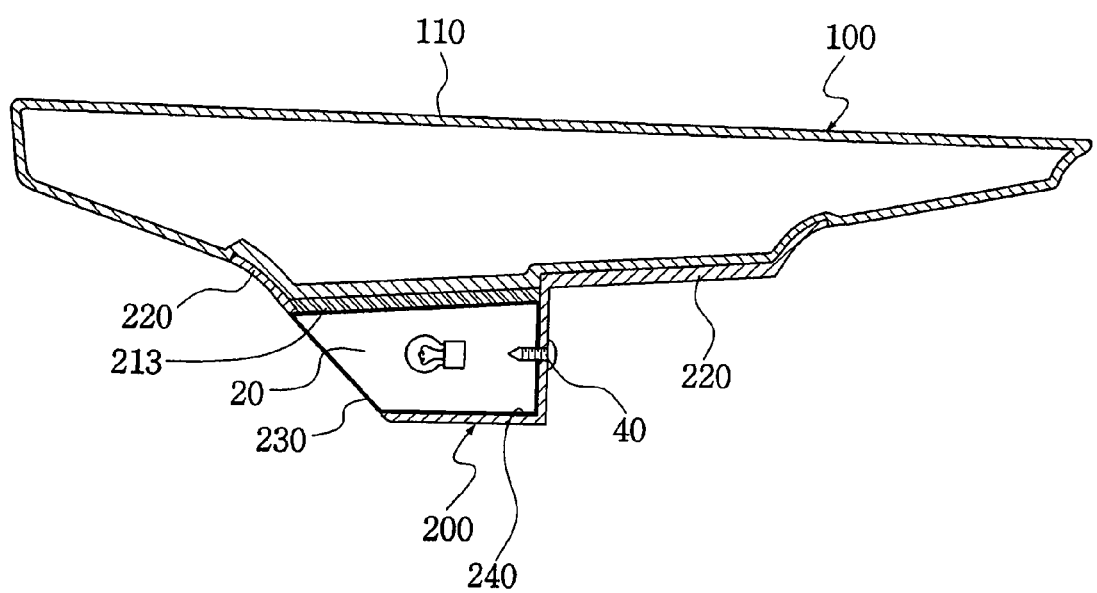
FIG. 3 is a schematic cross-sectional view illustrating a spoiler having an integral stop lamp cover in accordance with an embodiment of the present invention.
Figure 4:
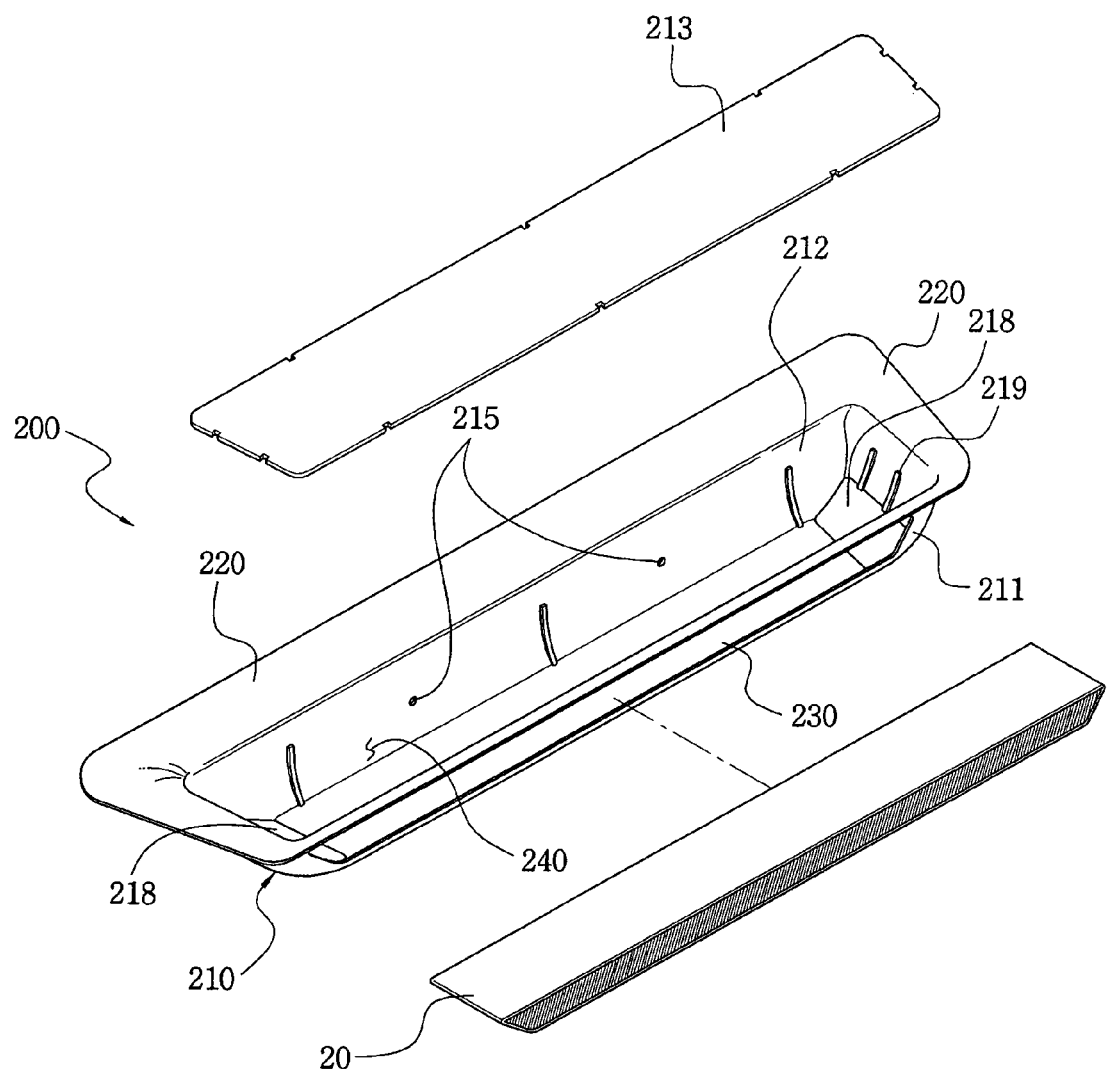
FIG. 4 is a perspective view illustrating a stop lamp cover according to a first embodiment of the present invention.

FIG. 3 is a schematic cross-sectional view illustrating a spoiler having an integral stop lamp cover in accordance with an embodiment of the present invention, and FIG. 4 is a perspective view illustrating a stop lamp cover according to a first embodiment of the present invention.

As can be readily seen from the drawings, in a spoiler 100 having an integral stop lamp cover in accordance with an embodiment of the present invention, a stop lamp cover 200, into which an auxiliary stop lamp 20 (hereinafter, simply referred to as a "stop lamp") is inserted, is integrally fused to a side of a spoiler body 110 which has a hollow sectional shape.

In consideration of the shapes and usefulness of the stop lamp 20 and the spoiler 100, the stop lamp cover 200 is formed to project downward from the middle portion of the spoiler body 110.

The stop lamp cover 200 has a thickness which can allow the stop lamp cover 200 to be easily fused with the spoiler body 110 in a blow molding process. A stop lamp insertion opening 230 is defined in the front wall of the stop lamp cover 200 so that the stop lamp 20, comprising light emitting means such as an LED or a bulb, can be inserted through the stop lamp insertion opening 230 into the stop lamp cover 200. The stop lamp cover 200 defines therein a stop lamp receiving space 240 which has a size capable of receiving the stop lamp 20.

A flange part 220 is formed on the outer edge of the upper end of the stop lamp cover 200 where the stop lamp cover 200 is fused with the spoiler body 110, and extends outward. The flange part 220 is formed to have a contour which conforms to that of the spoiler body 110 formed through the blow molding process.

In the stop lamp cover 200 formed as described above, the flange part 220 is integrally fused to the spoiler body 110 when implementing the blow molding process, and the stop lamp 20 is inserted into the stop lamp receiving space 240 defined in the stop lamp cover 200 and is maintained fixed therein by locking means such as bolts and nuts.

Depending upon the shape and the structure of the spoiler 100, one or more stop lamp covers 200 may be fused to the spoiler body 110.

The stop lamp cover 200 integrally fused to the spoiler 100 for a vehicle as described above may have various shapes and designs to meet the desires of users. Referring to FIG. 4, the stop lamp cover 200 comprises two component elements, that is, a cover body 210 and an upper plate 213 which covers the stop lamp receiving space 240 defined in the cover body 210.

The cover body 210 determines the outer appearance of the stop lamp cover 200. The size of the cover body 210 is determined depending upon the size and the shape of the stop lamp 20 received in the stop lamp receiving space 240. Preferably, in the cover body 210, the front wall 211 defining the stop lamp insertion opening 230, both side walls for protecting both side surfaces of the stop lamp 20, a rear wall 212 for protecting the rear surface of the stop lamp 20, and a bottom wall together define the stop lamp receiving space 240 and have slightly curved wall surfaces.

The stop lamp insertion opening 230 defined in the front wall 211 has a size allowing the stop lamp 20 to be closely inserted through it. Therefore, with the stop lamp 20 fully inserted through the stop lamp insertion opening 230, the front portion of the stop lamp 20 is brought into close contact with the inner surface of the front wall 211 of the cover body 210 which defines the stop lamp insertion opening 230, so that the stop lamp 20 is not vibrated even when shock is externally applied to the stop lamp cover 200 while the vehicle travels on a road. A plurality of locking holes 215 are defined through the rear wall 212 of the cover body 210. The locking holes 215 have a size for allowing the locking means 40 such as bolts to pass through them to thereby be locked with nuts. Thus, by locking the stop lamp 20 using the locking means 40 which pass through the locking holes 215, the stop lamp 20 can be fixedly maintained in the stop lamp receiving space 240.

Depending upon the size of the cover body 210, protruding parts 218 are formed on the inner surface of the cover body 210 which defines the stop lamp receiving space 240, to protrude inward, so that the stop lamp 20 inserted into the stop lamp receiving space 240 can be placed on or engaged with the protruding parts 218 to be stably maintained in the fixed state. Accordingly, since the stop lamp 20 is closely received in the stop lamp receiving space 240 of the stop lamp cover 200 and is firmly fastened to the rear wall 212 of the stop lamp cover 200 by the locking means 40, the stop lamp 20 is not vibrated while the vehicle travels on a road and is prevented from being released from the stop lamp cover 200 even after a lengthy period of time has elapsed.

Moreover, the stop lamp 20 can be firmly fastened to the stop lamp cover 200 using not only the locking means 40 passing through the locking holes but also an adhesive tape.

As described above, the flange part 220 is formed on the outer edge of the upper end of the stop lamp cover 200 and extends outward. When implementing the spoiler blow molding process, the flange part 220 is fused to the spoiler body 110. In consideration of this, the flange part 220 is formed to extend outward from the upper end of the stop lamp cover 200 and has the same contour as the spoiler body 110. Due to this fact, the flange part 220 is integrated with the material of the spoiler 100 without using separate coupling means. As a result, the stop lamp cover 200 is integrated with the spoiler 100 for a vehicle through the blow molding process.

The flange part 220 of the cover body 210 is fused to the spoiler body 110 and has a size capable of preventing the stop lamp cover 200 from being easily released from the spoiler 100 even when shock is externally applied to the stop lamp cover 200.

The upper plate 213 of the stop lamp cover 200 has a size capable of covering the stop lamp receiving space 240 and is positioned in the stop lamp receiving space 240. The upper plate 213 is fitted into the upper part of the cover body 210 such that the stop lamp insertion opening 230 defined in the front wall 211 of the cover body 210 is positioned below the upper plate 213.

Hence, a parison fusing section to which a melted parison for forming the spoiler body 110 is fused is concavely defined on the upper plate 213 in the upper part of the cover body 210, and the stop lamp receiving space 240 in which the stop lamp 20 is received and maintained in a fixed state is defined below the upper plate 213 in the lower part of the cover body 210.

A plurality of support parts 219 are formed on the inner surface of the cover body 210, which defines the stop lamp receiving space 240, in a manner such that they project inward to support the upper plate 213. The support parts 219 support and fix the upper plate 213 to prevent the upper plate 213 from being released from the cover body 210 and from being moved downward by the weight of the melted parison when implementing the blow molding process. The support parts 219 comprise ribs formed on the inner surface of the cover body 210 to endure the force applied downward from the melted parison.

Figure 5:
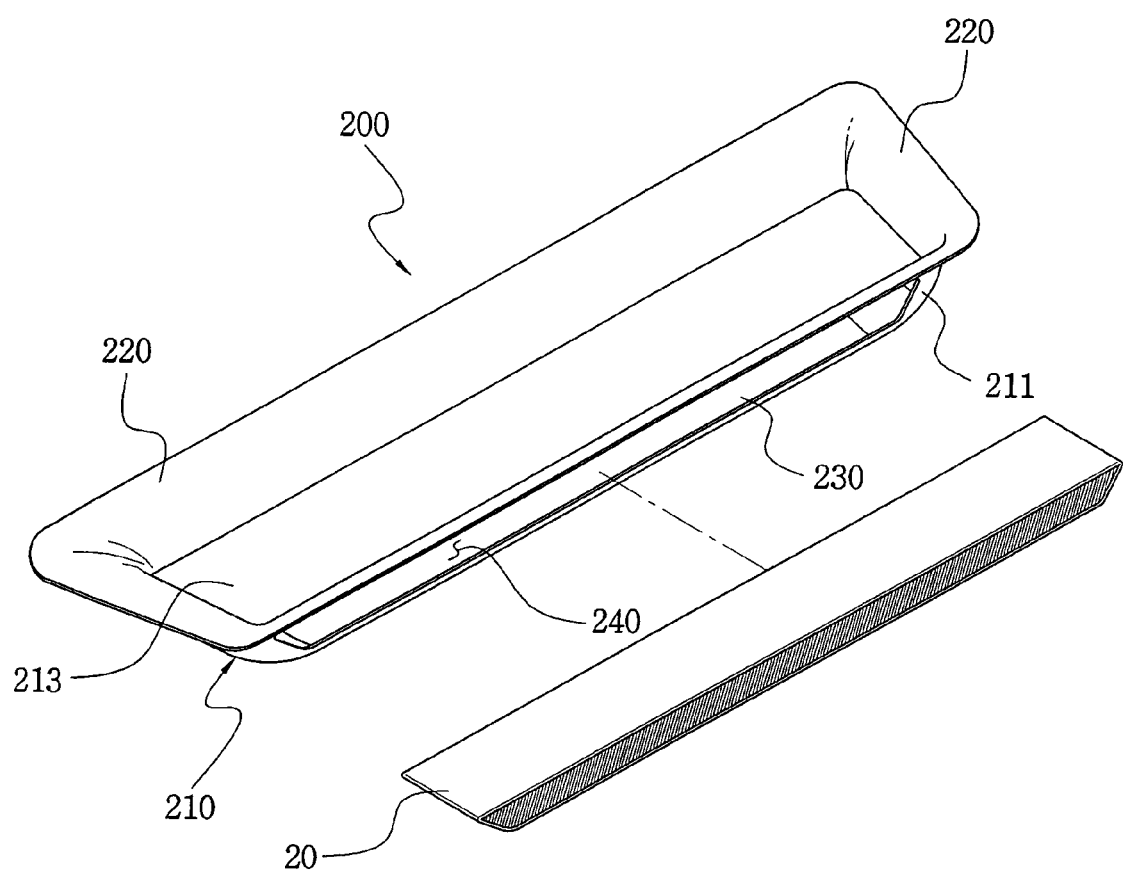
FIG. 5 is a perspective view illustrating another stop lamp cover according to a second embodiment of the present invention.

FIG. 5 is a perspective view illustrating another stop lamp cover according to a second embodiment of the present invention. As shown in the drawing, in the stop lamp cover 200 to be integrated with the spoiler 100 in accordance with this embodiment of the present invention, the cover body 210, defining the outer appearance of the stop lamp cover 200, and the upper plate 213, defining the parison fusing section, are formed integrally with each other to constitute a single product.

The stop lamp cover 200 which is constituted by the single part is inserted into a mold when blow-molding the spoiler 100 having a simple configuration, to be integrated with the spoiler 100. As in the first embodiment, the upper plate 213 defines the concave parison fusing section in the upper part of the cover body 210.

As shown in the first and second embodiments, in the stop lamp cover 200 which defines the parison fusing section on the upper plate 213, since the parison fusing section is defined to be concave, even when shock is externally applied to the cover body 210 from a side of the spoiler 100 for a vehicle, the stop lamp cover 200 is prevented from being damaged and released from the spoiler body 110.

The stop lamp cover 200 constructed as mentioned above is inserted into one mold when implementing the spoiler blow molding process. With the stop lamp cover 200 inserted into the mold, as the melted parison for forming the spoiler body 110 is fused to the flange part 220, the stop lamp cover 200 is primarily integrated with the spoiler 100. Then, as the melted parison is introduced into the parison fusing section defined on the upper plate 213 of the stop lamp cover 200 and fused to the upper plate 213 and the inner surface of the upper part of the cover body 210, the stop lamp cover 200 is secondarily integrated with the spoiler 100.

Figure 6A:
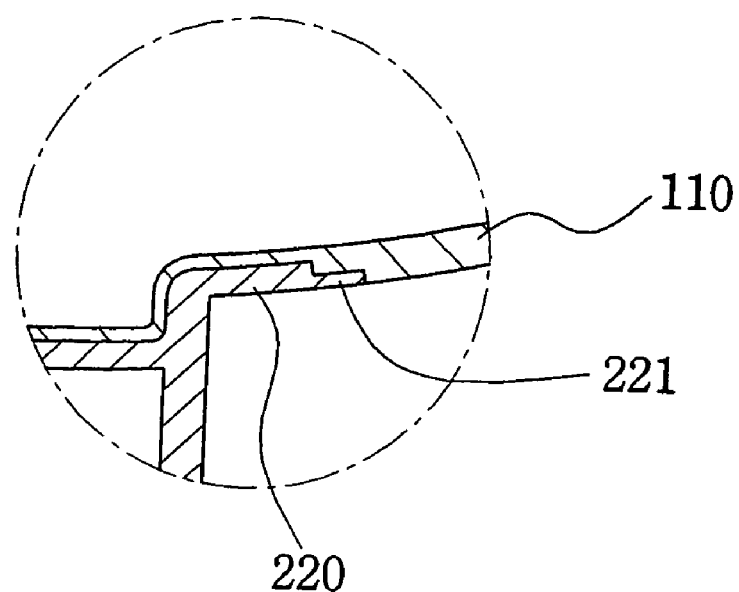
Figure 6B:
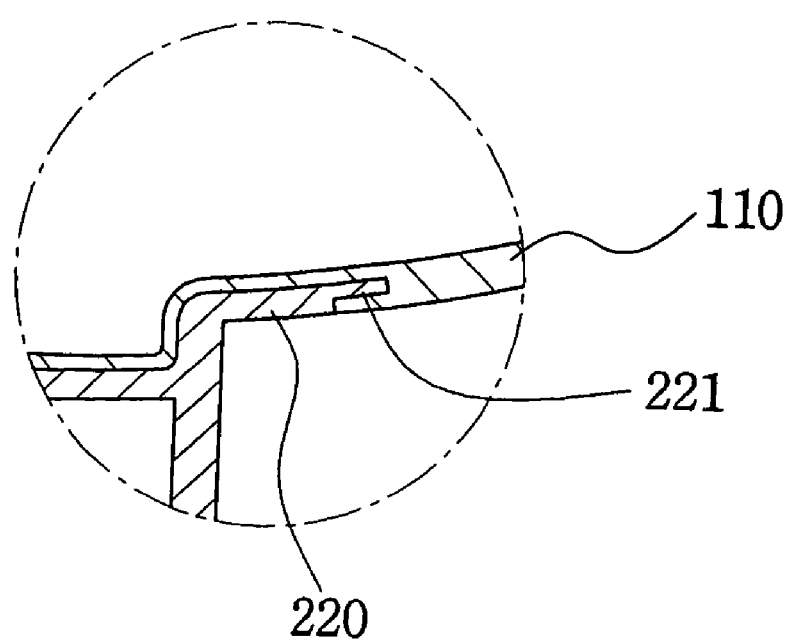

FIGS. 6a, 6b and 6c are enlarged cross-sectional views illustrating various flange parts of the stop lamp cover which are integrated with the spoiler body according to the present invention. In order to ensure that the flange part 220 is easily fused to the spoiler body 110 when implementing the blow molding process, the flange part 220 which is integrated with the spoiler body 110 may be formed at the distal end thereof with a stepped portion 221 or may have auxiliary adhesive means 222 such as an adhesive tape or a plastic primer.

Referring to FIG. 6a, the stepped portion 221 is projectedly formed on the distal end of the flange part 220 in such a way as to be flush with the lower surface of the flange part 220. Therefore, as a parison melted in the blow molding process is integrally fused to the stepped portion 221, defective fusion of the flange part 220 and the generation of a fine gap on the distal end of the flange part 220 can be avoided.

Referring to FIG. 6b, the stepped portion 221 is projectedly formed on the distal end of the flange part 220 in such a way as to be flush with the upper surface of the flange part 220. In this flange part 220, because the melted parison is fused to the flange part 220 to surround the upper and lower surfaces of the stepped portion 221, fusion force can be further increased.

Referring to FIG. 6c, the auxiliary adhesive means 222, such as an adhesive tape or a plastic primer, is provided to the upper surface of the flange part 220. Due to the presence of the auxiliary adhesive means 222, the melted parison for forming the spoiler body 110 and the flange part 220 are more firmly fused to and integrated with each other.

FIGS. 7a and 7b through 9 are schematic cross-sectional views illustrating the blow molding process for forming the spoiler having an integral stop lamp cover according to the present invention.

Figure 8A:
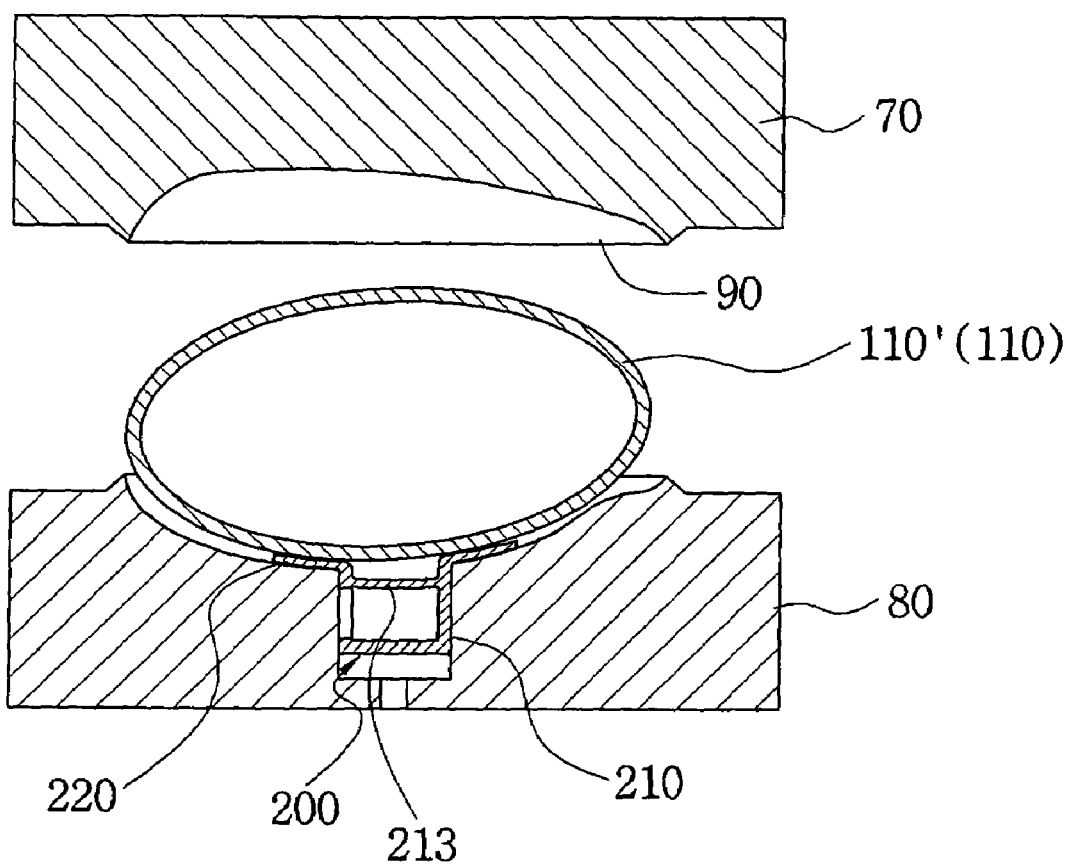
Figure 8B:
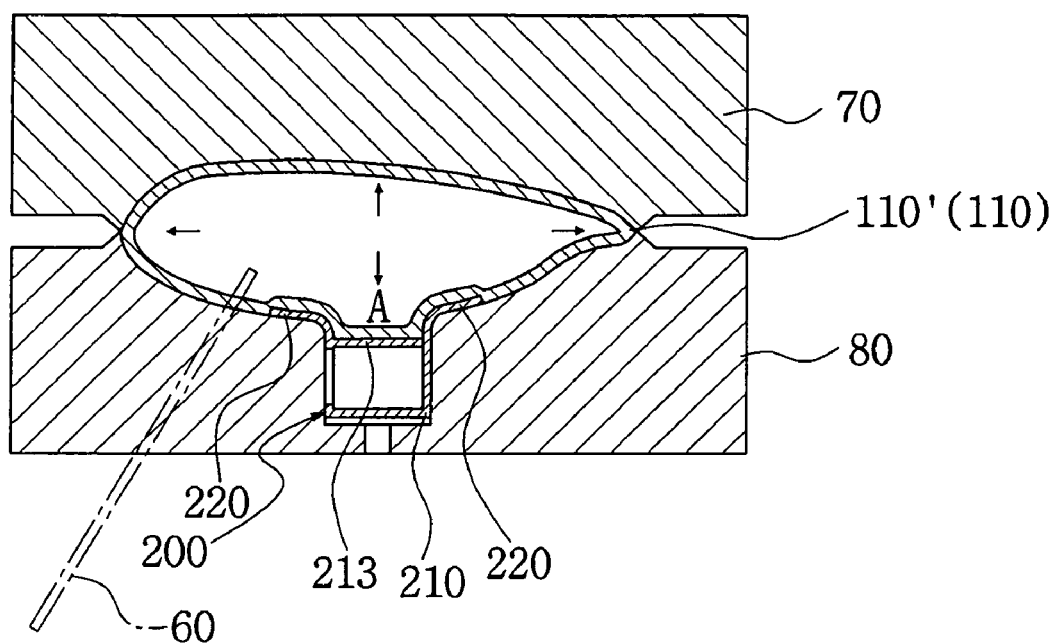
Figure 9:
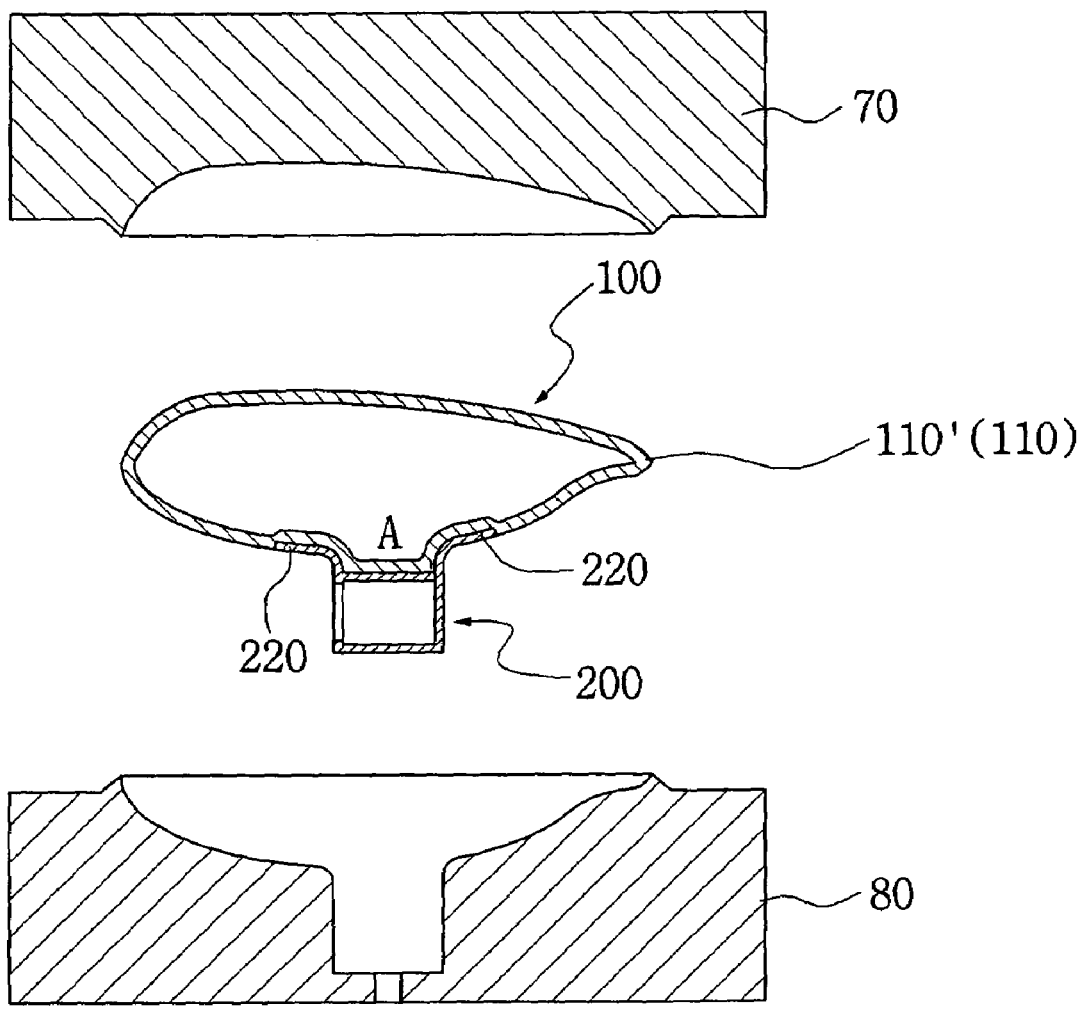

As shown in these drawings, in order to integrally fuse the stop lamp cover 200 to the spoiler body 110, the spoiler blow molding process largely comprises a stop lamp cover accommodation step (see FIGS. 7a and 7b), an air blowing step using the melted parison (see FIGS. 8a and 8b), and a product discharge step (see FIG. 9).

Upper and lower molds 70 and 80 have cavities 90 which together define the desired shape of a vehicle spoiler 100 to be molded, and a stop lamp cover accommodating groove 81 into which the stop lamp cover 200 is accommodated is defined in the lower mold 80.

Figure 7A:
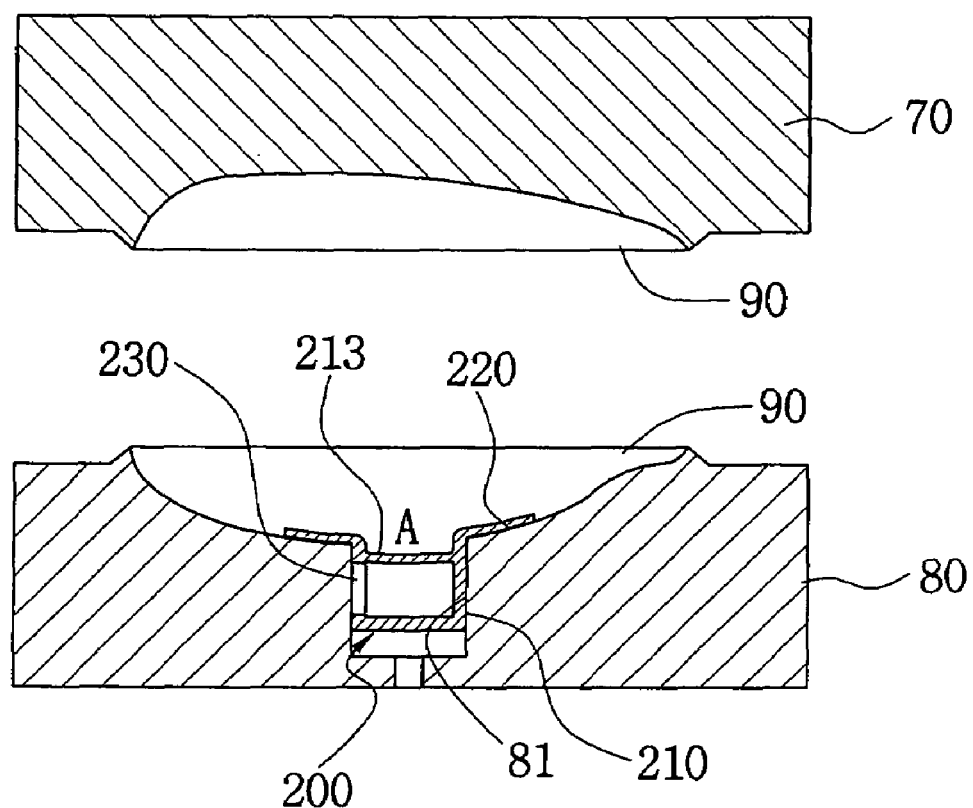
Figure 7B:
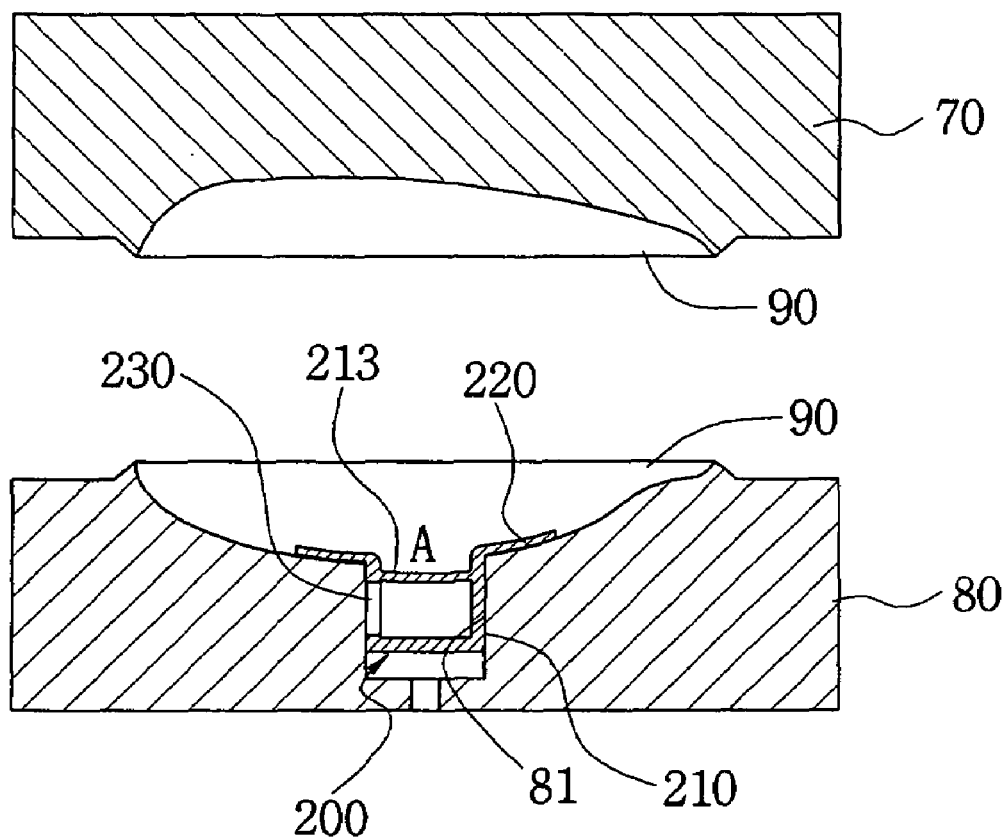

In the stop lamp accommodation step, the stop lamp cover 200 is accommodated in the stop lamp cover accommodating groove 81. In the case of the stop lamp cover 200 constituted by the separate cover body 210 and upper plate 213, that is, two component elements, as shown in FIG. 7a, the cover body 210 defining the outer appearance of the stop lamp cover 200 is first accommodated in the stop lamp cover accommodating groove 81, and the upper plate 213 is fitted in the cover body 210. Further, in the case of the stop lamp cover 200 constituted by the integral cover body 210 and upper plate 213, that is, one component element, as shown in FIG. 7b, the entire stop lamp cover 200 is accommodated in the stop lamp cover accommodating groove 81 which is defined in the lower mold 80.

Also, the flange part 220, which is formed on the upper end of the cover body 210, is positioned outside the stop lamp cover accommodating groove 81 so that the flange part 220 can be easily fused to a portion of the cavity 90 to be formed as part of the spoiler body 110.

The upper plate 213 is seated on the support parts 219 or is formed integrally with the cover body 210 so that the parison fusing section 'A' is defined in the upper part of the stop lamp cover 200. The parison fusing section 'A' indicates the space between the upper plate 213 and the inner surface of the upper part of the cover body 210.

After the stop lamp cover 200 is accommodated in the stop lamp cover accommodating groove 81 in the stop lamp cover accommodation step as shown in FIG. 8a, a parison flowing step is implemented, in which the melted parison 110' for forming the spoiler body 110 is introduced between the upper and lower molds 70 and 80. Next, as shown in FIG. 8b, the upper mold 70 is lowered to close the cavities 90, and the air blowing step is implemented. In the air blowing step, highly pressurized hot air is blown through a blow pin 60 into the parison 110' which is positioned in the molds 70 and 80.

Thereby, the parison 110' is inflated by the highly pressurized hot air so as to conform to the contours of the upper and lower molds 70 and 80 which define the cavities 90. In conformity with the sectional shape of the cavities 90, the parison 110' has the corresponding shape of the spoiler body 110.

At this time, one portion of the parison 110', which is inflated by the highly pressurized hot air so as to conform to the shape of the spoiler body 110, is fused to the flange part 220 of the stop lamp cover 200, and another portion of the parison 110' is introduced into the parison fusing section 'A' of the stop lamp cover 200 which is inserted into the lower mold 80. The parison 110' which is introduced into the parison fusing section 'A' is integrally fused to the upper plate 213 and the inner surface of the upper part of the cover body 210 which together define the parison fusing section 'A'.

As a consequence, since the parison 110' is primarily fused to the flange part 220 and secondarily fused to the stop lamp cover 200 in the parison fusing section 'A', the stop lamp cover 200 can be firmly integrated with the material of the spoiler body 110 formed by the parison 110' without using separate coupling means to constitute a single piece of product.

Then, the spoiler 100, which is integrally formed with the stop lamp cover 200 in the air blowing step, is cooled by cooling water, etc. and discharged out of the molds 70 and 80 in the product discharge step as shown in FIG. 9.

As can be readily seen from the drawing, the parison fusing section 'A' and the flange part 220 of the stop lamp cover 200 are integrally formed with the material of the spoiler 100 without using separate coupling means to constitute the spoiler 100 having the integral stop lamp cover 200.

In the spoiler 100 having the integral stop lamp cover 200, because the stop lamp cover 200 is formed so as to be integrated with the spoiler 100 through the blow molding process, the number of parts is decreased and the manufacturing cost can be reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A spoiler for a vehicle, formed through a blow molding process to have a hollow sectional shape, comprising:
   a stop lamp cover, comprising:
   a cover body configured to be open at an upper end thereof, and having a stop lamp insertion opening which is defined on a front wall of the cover body to allow a stop lamp to be inserted through it, a stop lamp receiving space, in which the stop lamp, inserted through the stop lamp insertion opening, is received and a flange part which is formed on an upper end of the cover body and extends outward; and
   an upper plate coupled to an upper part of the cover body, having a size capable of covering the stop lamp receiving space, and defining the lower stop lamp receiving space in which the stop lamp is received and an upper parison fusing section to which a parison for forming a spoiler body is fused in the blow molding process;
   wherein the stop lamp cover is inserted into a mold when implementing the blow molding process for forming the spoiler, the flange part is fused to an outer surface of the spoiler body to be integrated with the material of the spoiler without using separate coupling means, and the parison is fused to the parison fusing section, whereby the spoiler having the integral stop lamp cover is formed.

2. The spoiler according to claim 1, wherein a plurality of support parts, each comprising a rib, are formed on an inner surface of the cover body to support the upper plate, and a plurality of protruding parts are also formed on the inner surface of the cover body to maintain the stop lamp, inserted through the stop lamp insertion opening, in a fixed state.

3. The spoiler according to claim 1, wherein the cover body and the upper plate of the stop lamp cover are formed so as to be integrated with each other to constitute a single part.

4. The spoiler according to claim 1, wherein the parison fusing section defined by the upper plate has a depth sufficient to prevent the stop lamp cover from becoming separated from the spoiler body even when shock is externally applied to the stop lamp cover.

5. The spoiler according to claim 1, wherein the stop lamp cover further comprises auxiliary adhesive means such as an adhesive tape or a plastic primer, for allowing the flange part to be easily fused to the spoiler body.

6. The spoiler according to claim 1, wherein locking holes are defined through a rear wall of the stop lamp cover so that locking means such as bolts can pass through the locking holes to be locked with nuts.

7. The spoiler according to claim 6, wherein the stop lamp is fastened to the stop lamp cover by the locking means passing through the locking holes or by an adhesive tape.

* * * * *